(12) United States Patent
Ching

(10) Patent No.: US 6,453,770 B1
(45) Date of Patent: Sep. 24, 2002

(54) PEDAL STRUCTURE

(76) Inventor: Liu Chih Ching, 11F-2, No. 43, Chai-I Street, Taichung City (TW)

( * ) Notice: Subject to any disclaimer, the term of this patent is extended or adjusted under 35 U.S.C. 154(b) by 0 days.

(21) Appl. No.: 09/841,122

(22) Filed: Apr. 25, 2001

(51) Int. Cl.⁷ .................................................. G05G 1/14
(52) U.S. Cl. ........................ 74/594.5; 74/594.4; 482/57
(58) Field of Search ............................. 74/594.4, 594.6, 74/594.1, 594.3, 594.2, 594.5; 482/60, 57

(56) References Cited

U.S. PATENT DOCUMENTS

| | | | | |
|---|---|---|---|---|
| 543,844 A | * | 8/1895 | Bliven | 74/594.5 |
| 3,563,541 A | * | 2/1971 | Sanquist | 74/594.4 X |
| 3,943,797 A | * | 3/1976 | Jollie | 74/594.4 |
| 4,682,771 A | * | 7/1987 | Jean | 74/594.4 X |
| 5,203,827 A | * | 4/1993 | Nestrud | 74/594.5 |
| 5,553,515 A | * | 9/1996 | Yang et al. | 74/594.3 |
| 5,662,006 A | * | 9/1997 | Angeltun | 74/594.4 |
| 5,785,601 A | * | 7/1998 | Kubesheski et al. | 472/135 |
| 5,833,583 A | * | 11/1998 | Chuang | 482/60 |
| 6,050,154 A | * | 4/2000 | Fan | 74/594.4 |

FOREIGN PATENT DOCUMENTS

| | | | | |
|---|---|---|---|---|
| JP | 9-2366 | * | 1/1997 | 74/594.4 |
| JP | 9-193872 | * | 7/1997 | 74/594.4 |

* cited by examiner

Primary Examiner—C. M Dinh
(74) Attorney, Agent, or Firm—Charles E. Baxley

(57) ABSTRACT

A pedal structure includes a pedal body having a protrusion extending from an underside thereof. A passage is defined through the protrusion and a separation rib in the passage separates the passage into an upper portion for receiving a threaded rod and a lower portion for receiving a weight. A ridge extends from an inner periphery of the passage and a cover has a groove defined in an outer periphery thereof. The cover is engaged with the passage with the ridge engaged with the groove.

1 Claim, 3 Drawing Sheets

PEDAL STRUCTURE

FIELD OF THE INVENTION

The present invention relates to a pedal structure that has a passage for receiving a weight and a cover which has a groove in a periphery thereof and the groove receives ridges on an inner periphery of the passage so that the cover will not disengage from the pedal.

BACKGROUND OF THE INVENTION

A conventional pedal for bicycles is shown in FIGS. 1 and 2 and generally includes a pedal body 1 having a protrusion 11 extending from an underside thereof and a passage is defined through the protrusion 11. A separation rib separates the passage into an upper portion 111 and a lower portion 112. The upper portion 111 is to receive a threaded rod 15 and the lower portion 112 is to receive a weight 16. A cover 17 is engaged with a plan inner periphery of the passage so as to close the passage and prevent the weight 16 from dropping from the lower portion 112. The outer periphery 171 of the cover 17 and the inner periphery of the passage are plan surface so that the cover 17 is force-fitted with the inner periphery of the passage. When the pedal is tested as an impact test, an impact applied on the pedal could shank the cover 17 off the pedal body 1, and the weight 16 drops from the lower portion 112. The pedal then fails to pass the test and could not obtain the permission of production from the authority.

The present invention intends to provide a pedal structure wherein the cover has groove and a ridge extends from an inner periphery of the passage so that the cover is securely engaged with the passage by receiving the ridge in the groove.

SUMMARY OF THE INVENTION

In accordance with one aspect of the present invention, there is provided a pedal structure and comprises a pedal body having a protrusion extending from an underside thereof and a passage is defined through the protrusion. A separation rib in the passage separates the passage into an upper portion for receiving a threaded rod, and a lower portion for receiving a weight. A ridge extends from an inner periphery of the passage and a cover is engaged with the passage. The cover has a groove defined in an outer periphery thereof so as to receive the ridge.

The primary object of the present invention is to provide a pedal that has a cover securely engaged with the passage so as to effectively prevent the weight from dropping from the passage.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
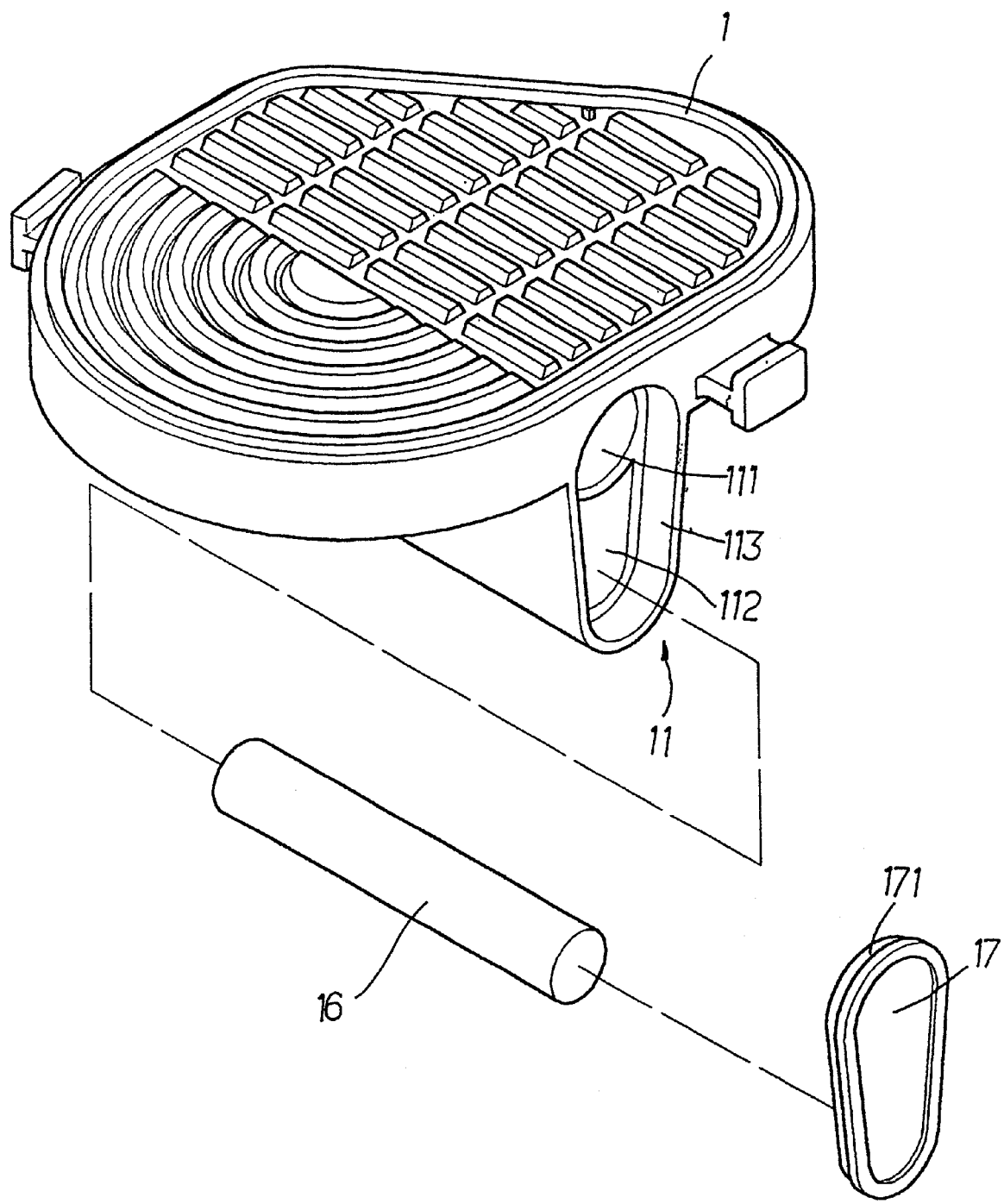
FIG. 1 is an exploded view to show a conventional pedal structure.
Figure 4:
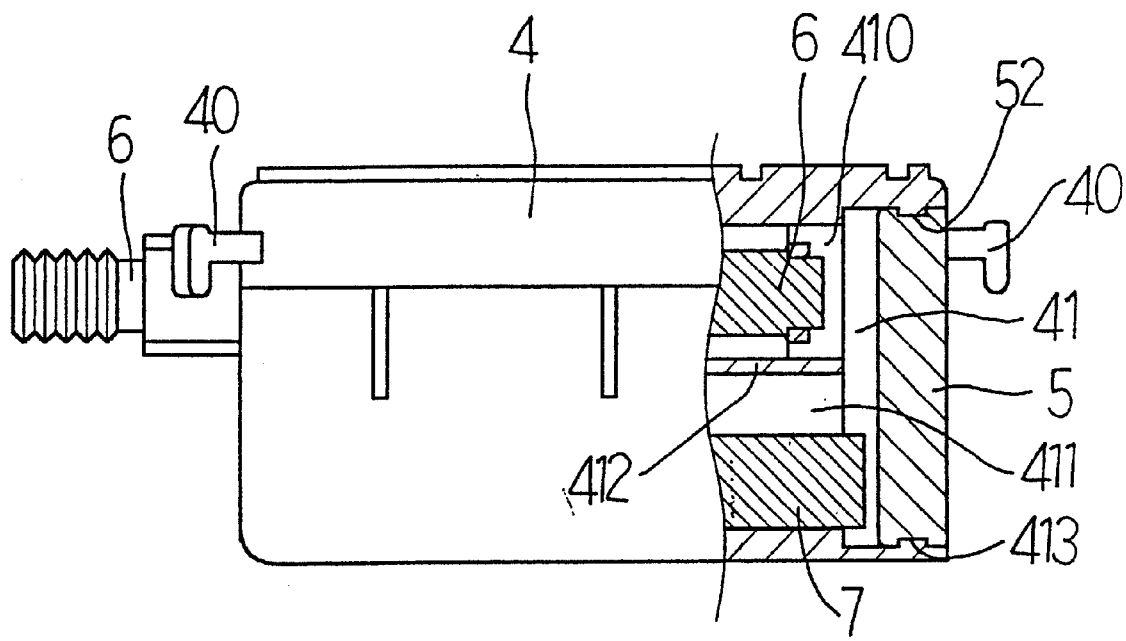
FIG. 4 is a cross sectional view to show the pedal structure of the present invention.
Figure 2:
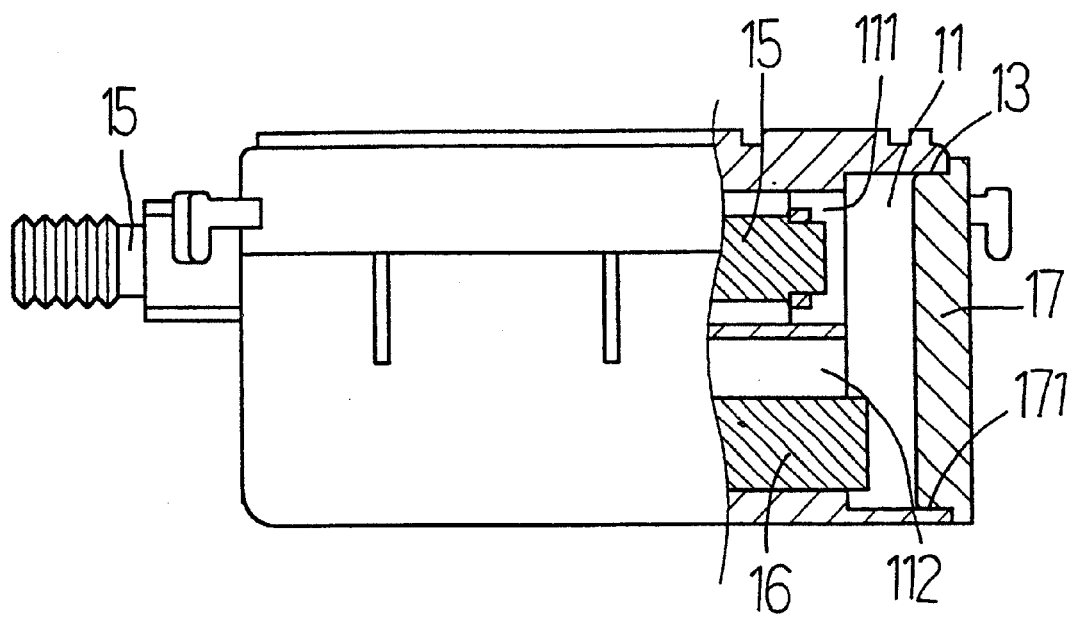
FIG. 2 is a cross sectional view to show the conventional pedal structure.
Figure 3:
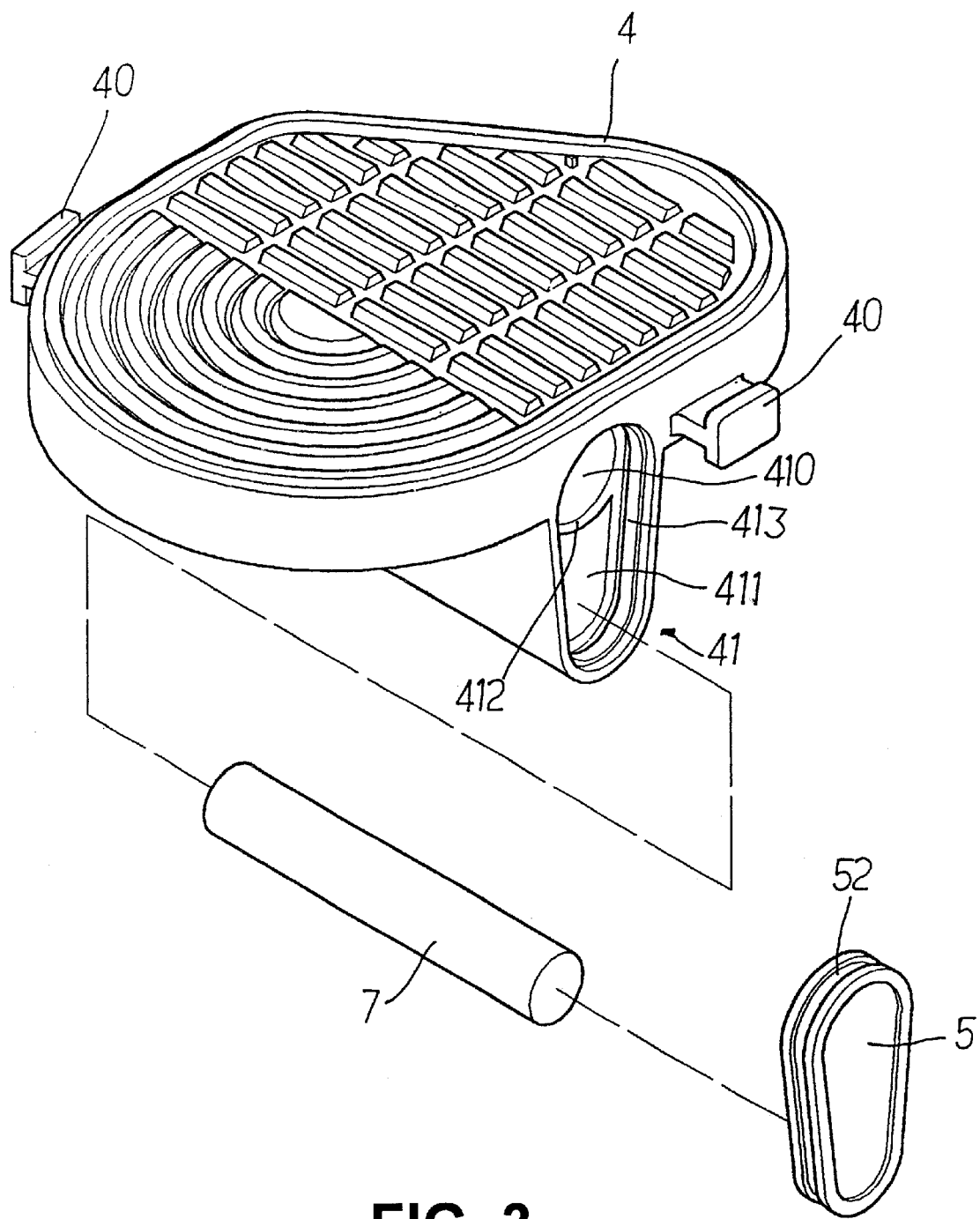
FIG. 3 is an exploded view to show a pedal structure of the present invention.

Referring to FIGS. 3 and 4, the pedal structure of the present invention comprises a pedal body 4 which has a protrusion 41 extending from an underside thereof and a passage is defined through the protrusion 41. A separation rib 412 in the passage separates the passage into an upper portion 410 and a lower portion 411. A threaded rod 6 is received in the upper portion 410 and a weight 7 is received in the lower portion 411. There is a section at an end of the passage where the separation rib 412 does not exist, the section has a ridge 413 extending from an inner periphery thereof. Two lugs 40 extend from the pedal body 4 in opposite with each other and a toe clip (not shown) is connected between the two lugs 40.

A cover 5 has a groove 52 defined in an outer periphery thereof and the cover 5 is engaged with the section of the passage with the ridge 413 engaged with the groove 52.

The cover 5 is securely positioned in the section of the passage by the engagement of the ridge 413 and the groove 52 so that when the pedal is impacted by a force, the cover 5 will not disengage from the pedal.

While we have shown and described the embodiment in accordance with the present invention, it should be clear to those skilled in the art that further embodiments may be made without departing from the scope of the present invention.

What is claimed is:

1. A pedal structure comprising:

a pedal body having a protrusion extending from an underside thereof and a passage defined through said protrusion, a separation rib in said passage and separating said passage into an upper portion and a lower portion, a threaded rod received in said upper portion and a weight received in said lower portion, a ridge extending from an inner periphery of said passage;

a cover having a groove defined in an outer periphery thereof and said cover engaged with said passage with said ridge engaged with said groove.

* * * * *